United States Patent
Ali et al.

(10) Patent No.: US 8,028,165 B2
(45) Date of Patent: Sep. 27, 2011

(54) TRUSTED PLATFORM FIELD UPGRADE SYSTEM AND METHOD

(75) Inventors: Valiuddin Y. Ali, Houston, TX (US); Manuel Novoa, Houston, TX (US); Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1207 days.

(21) Appl. No.: 11/413,300

(22) Filed: Apr. 28, 2006

(65) Prior Publication Data
US 2007/0255948 A1   Nov. 1, 2007

(51) Int. Cl.
*H04L 29/06* (2006.01)
(52) U.S. Cl. .................... 713/167; 713/164
(58) Field of Classification Search .......... 713/164–167, 713/187–189, 1, 2; 717/168–178; 726/22–25, 726/26, 16, 17, 2; 705/59, 58, 66, 67, 73
See application file for complete search history.

(56) References Cited

U.S. PATENT DOCUMENTS

| | | | |
|---|---|---|---|
| 6,782,349 B2 | 8/2004 | Challener et al. | |
| 7,107,460 B2 * | 9/2006 | Cromer et al. | 713/193 |
| 7,200,861 B2 * | 4/2007 | Alperin et al. | 726/2 |
| 7,484,099 B2 * | 1/2009 | Bade et al. | 713/176 |
| 2003/0037246 A1 | 2/2003 | Goodman et al. | |
| 2004/0003265 A1 | 1/2004 | Freeman et al. | |
| 2004/0199769 A1 * | 10/2004 | Proudler | 713/169 |
| 2004/0205070 A1 | 10/2004 | Catherman et al. | |
| 2005/0021968 A1 | 1/2005 | Zimmer et al. | |
| 2005/0114682 A1 | 5/2005 | Zimmer et al. | |
| 2006/0026422 A1 | 2/2006 | Bade et al. | |
| 2006/0107032 A1 * | 5/2006 | Paaske et al. | 713/2 |
| 2006/0242428 A1 * | 10/2006 | Tarkkala | 713/189 |
| 2007/0174600 A1 * | 7/2007 | Williams et al. | 713/1 |
| 2007/0192580 A1 * | 8/2007 | Challener et al. | 713/2 |
| 2008/0148387 A1 * | 6/2008 | Madina et al. | 726/16 |

OTHER PUBLICATIONS

TCPA Main specification Ver. 1.1b , Feb. 22, 2002 (pp. 11, 34, 242, 251, 314).*
TCG Physical Presence Interface Specification Ver 1.00-5, Apr. 2007.*
TCPA PC specific Implementation specification Ver 1.0 Sep. 2001 (p. 70 section 8.3).*
TCPA main specification ver 1.1B Feb. 2002 (pp. 4, 11, 34, 37, 49, 133, 134, 216, 242, 251, 302, 314, 315].*
International Search Report Dated Aug. 28, 2007.
"Trusted Computing Platform Alliance (TCPA) Main Specification Versio 1.1b" TCPA Main Specification, Feb. 22, 2002, p. 1 (1), p. 41 (4.133), p. 314 (10.17) & p. 315 (10.17.1).
Chinese First Office Action dated Jul. 7, 2010, pp. 5.
CN Office Action, Appln No. 200780015503.4, date of mailing Apr. 28, 2011, 5 p.
Translation of CN Office Action, Appln No. 200780015503.4, date of mailing Apr. 28, 2011, 9 p.

* cited by examiner

*Primary Examiner* — Nirav B Patel

(57) ABSTRACT

A trusted platform field upgrade system comprises a trusted platform module (TPM) having a volatile memory, the volatile memory having a flag for verifying physical presence in a non-ownership state of the TPM, the TPM configured to enable a field upgrade to the TPM in an operating system (OS) environment based on assertion of the physical presence flag.

10 Claims, 3 Drawing Sheets

TRUSTED PLATFORM FIELD UPGRADE SYSTEM AND METHOD

BACKGROUND OF THE INVENTION

The Trusted Computing Group (TCG) develops and promotes industry standard specifications for hardware-enabled trusted computing and security technologies such as a trusted platform module (TPM). A TPM enables secure storage of digital keys, certificates and passwords and is less vulnerable to software and hardware attacks. In general, TPMs are delivered to a customer without an "owner" so that the customer can take "ownership" of the TPM which in turn facilitates enablement/disablement of the TPM and activation/deactivation of TPM capabilities. Once in the field (e.g., "manufacturing complete"), an upgrade to TPM capabilities may be desired or required. However, when a field upgrade is ready to be implemented or executed, ownership of the TPM has not necessarily been established, thereby hindering application of the field upgrade.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
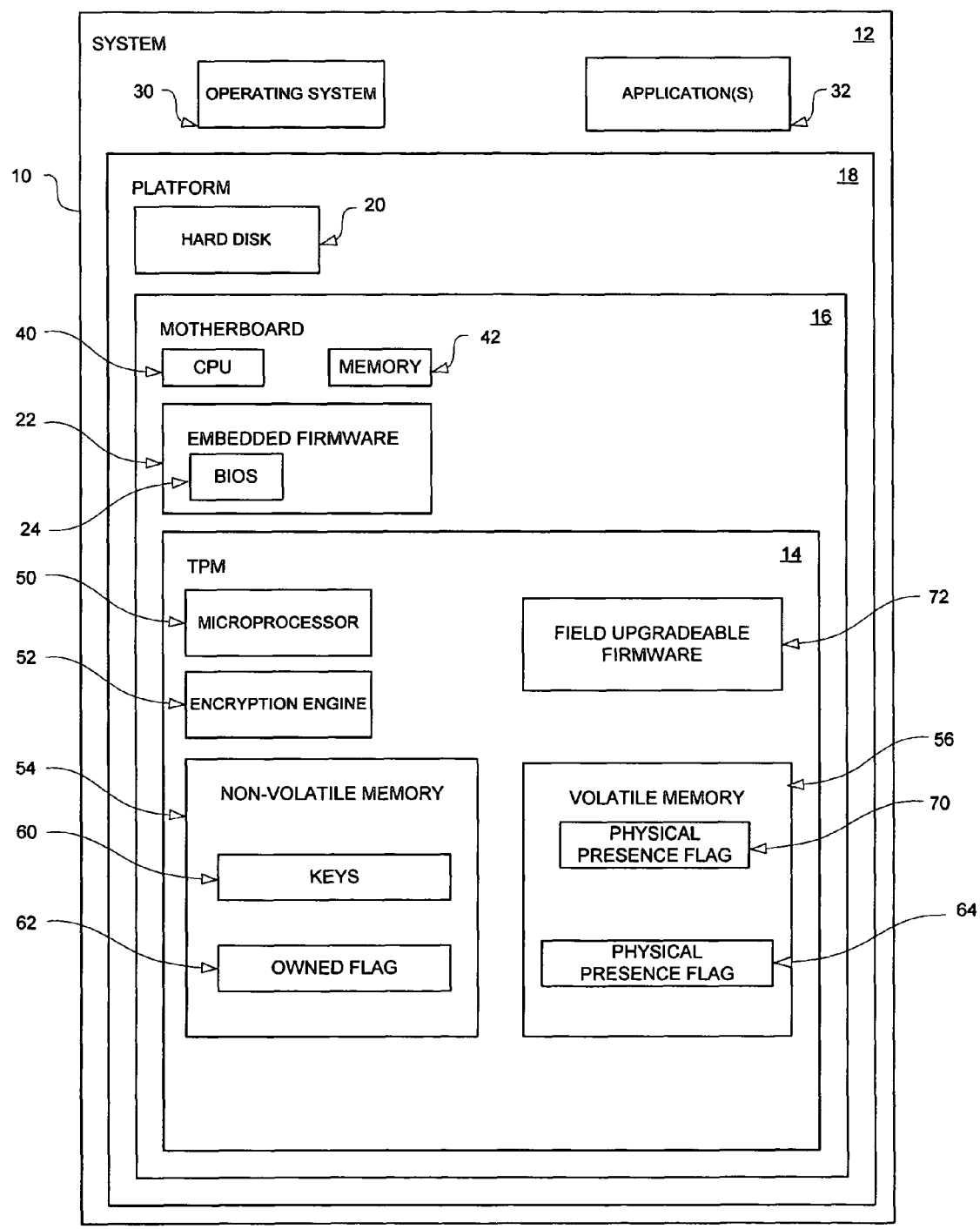
FIG. 1 is a block diagram illustrating an embodiment of a trusted platform field upgrade system in accordance with the present invention.
Figure 2A:
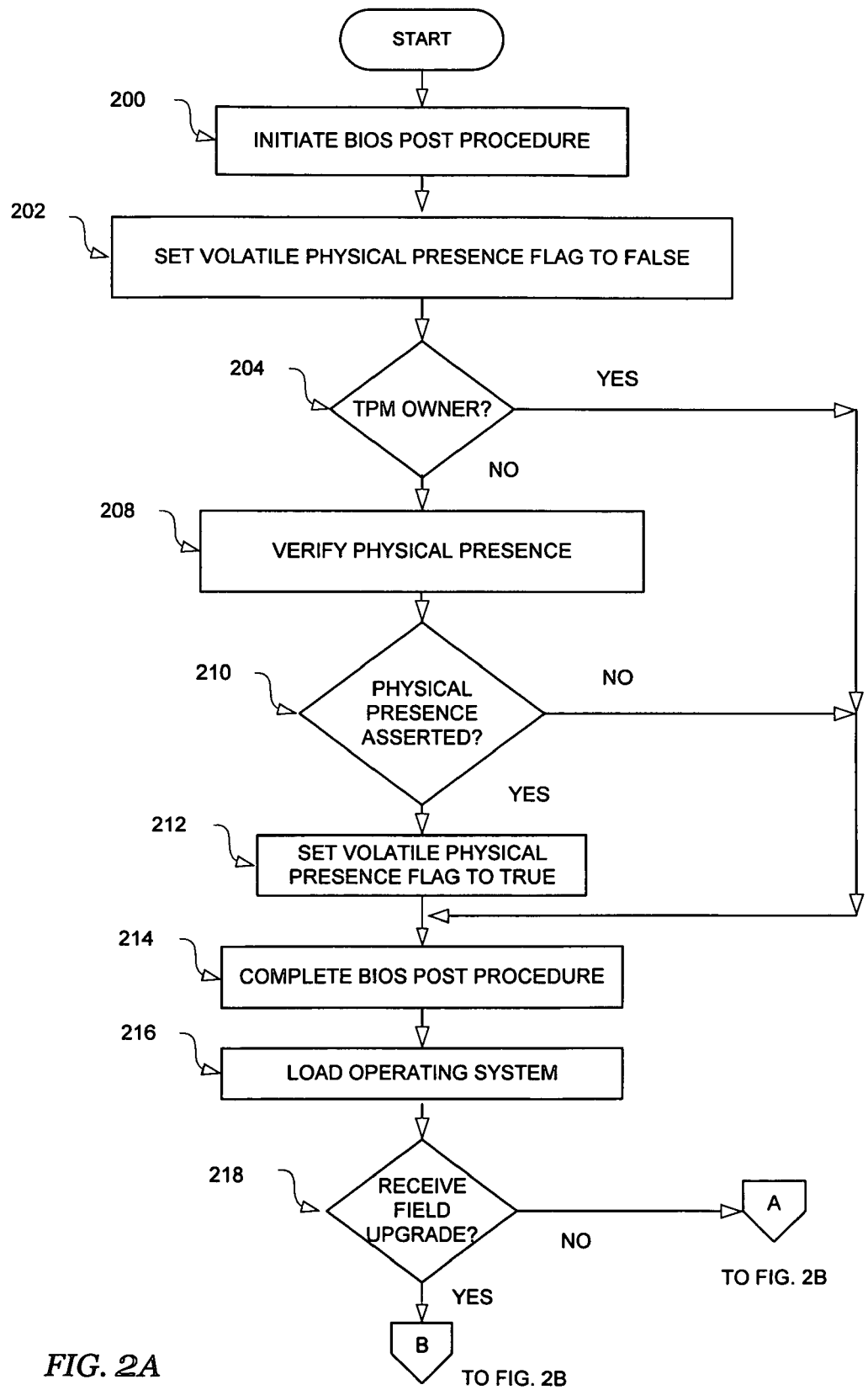
FIGS. 2A and 2B are flow diagrams illustrating an embodiment of a trusted platform field upgrade method in accordance with the present invention.
Figure 2B:
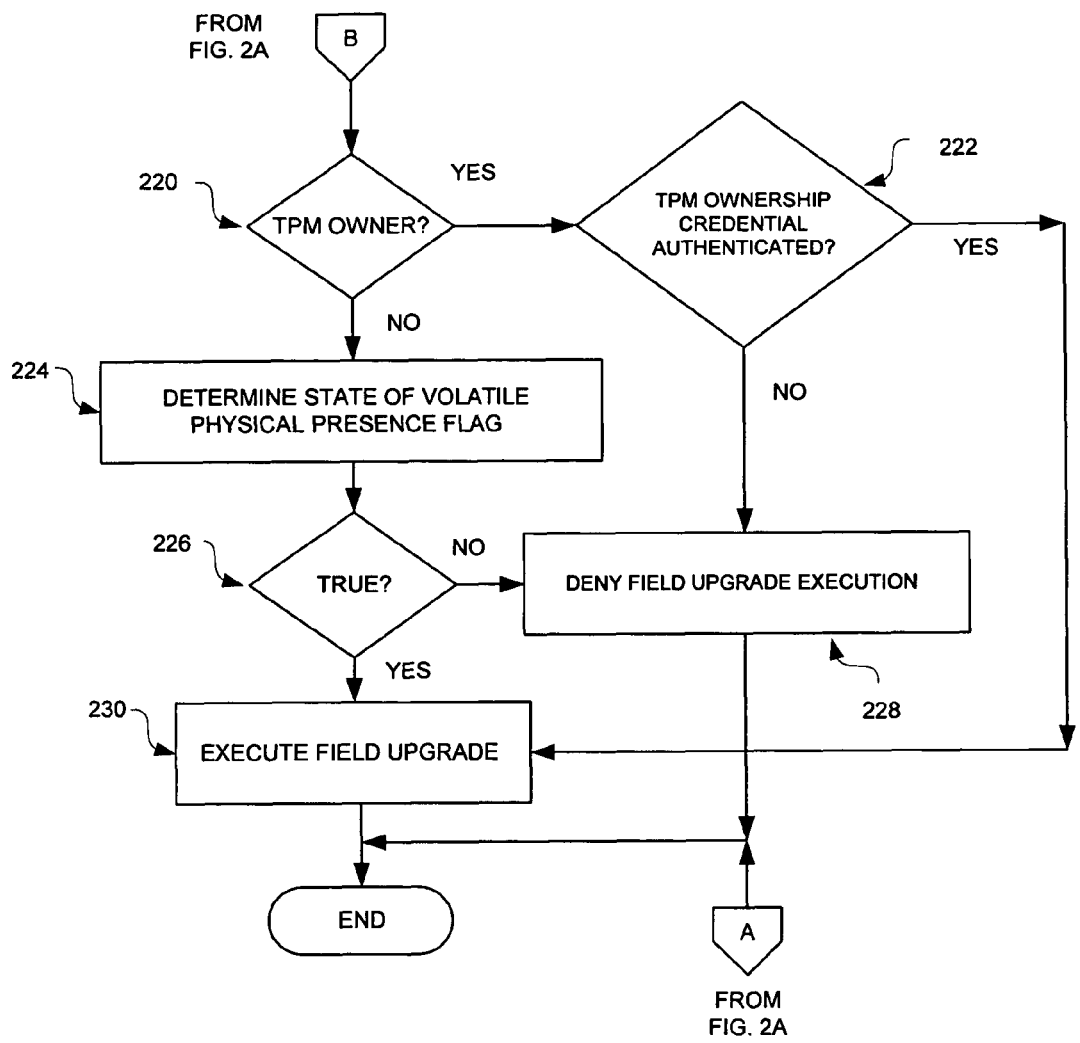

The preferred embodiments of the present invention and the advantages thereof are best understood by referring to FIGS. 1-2B of the drawings, like numerals being used for like and corresponding parts of the various drawings.

FIG. 1 is a block diagram illustrating an embodiment of a trusted platform field upgrade system 10 in accordance with the present invention. In the embodiment illustrated in FIG. 1, system 10 comprises a computing system 12 having a trusted platform module (TPM) 14 disposed on a motherboard 16. Generally, TPM 14 is used to store and report the values of measurements (integrity metrics) of certain software and hardware on a platform 18 of system 12. For example, in some embodiments of the present invention, TPM 14 is used to measure, store and report the integrity of a hard disk 20 and embedded firmware 22 such as basic input/output system (BIOS) 24. However, it should be understood that TPM 14 may be used to store and report the integrity of other devices and/or hardware and is used to securely store platform information and secrets such as passwords, keys and certificates.

In the embodiment illustrated in FIG. 1, system 12 comprises at least one operating system (OS) 30 and one or more executable applications 32. Further, motherboard 16 is configured having a central processing unit (CPU) 40 and a memory 42. In the embodiment illustrated in FIG. 1, TPM 14 comprises a microprocessor 50, an encryption engine 52, a non-volatile memory 54, and a volatile memory 56. It should be understood that TPM 14 may comprise other components such as, but not limited to, platform configuration registers, an input/output component acting as an interface to TPM 14, a random number generator, a key generation engine, and program code.

In the embodiment illustrated in FIG. 1, non-volatile memory 54 comprises keys 60 and an owned flag 62 stored and/or contained therein. Keys 60 generally comprise at-least one storage root key (SRK) and one platform endorsement key for performing authentication, signing, identification, endorsement or binding functions associated with TPM 14. Other keys, if present, are further protected through the SRK. Owned flag 62 comprises a bit stored in non-volatile memory 54 indicating whether ownership of TPM 14 has been established. For example, TPMs are generally delivered to a customer or end user without an owner so that the customer or end user can take ownership of the TPM to facilitate enablement/disablement of the TPM and activation/deactivation of TPM capabilities. Once ownership of TPM 14 has been established, owned flag 62 is set to a TRUE condition and is maintained in non-volatile memory 54 until cleared and/or otherwise reset.

In the embodiment illustrated in FIG. 1, volatile memory 56 comprises a physical presence flag 64 and a physical presence flag 70 stored and/or contained therein. Physical presence flag 64 comprises a bit stored in volatile memory 56 indicating whether a physical presence was asserted during a pre-OS 30 boot sequence and generally, once asserted, remains asserted until the pre-OS 30 boot sequence ends. For example, various operations and/or functions associated with TPM 14 require proof of physical presence in order to enable and/or process particular TPM commands and/or functions. Assertion of physical presence flag 64 may be performed locally (e.g., by an operator of system 12) or remotely (e.g., by an administrator). Assertion of physical presence during a pre-OS 30 boot cycle generally remains asserted until the boot cycle is completed. After pre-OS 30 boot processing, physical presence flag 64 is cleared and must generally be re-asserted for particular command processing on the next boot cycle. Inappropriate reassertion of the physical presence flag 64 during the remainder of a boot cycle is prevented by setting a physical presence lock bit after the pre-OS 30 boot cycle has completed.

In the embodiment illustrated in FIG. 1, volatile memory 56 also comprises a physical presence flag 70. Physical presence flag 70 is a bit stored in volatile memory 56 indicating whether proof of physical presence has been established during the period where the physical presence flag 64 indicates assertion of physical presence to approve execution of selected command(s) until after the physical presence flag 64 has been cleared and the physical presence lock bit has been set to TRUE (e.g., locking the condition where the physical presence flag 64 has been cleared). Thus, in contrast to physical presence flag 64, physical presence flag 70 is not cleared after pre-OS 30 boot processing but instead remains set until the next boot cycle. In the present invention, physical presence flag 70 is used when ownership of TPM 14 has not yet been established and/or has been otherwise cleared; however, it should be understood that physical presence flag 70 may also be used while the TPM is owned.

In operation, system 10 enables a field upgrade to be executed and/or otherwise implemented in TPM 14 (e.g., an upgrade to field upgradeable firmware 72 of TPM 14 and/or a factory reset) when TPM 14 is in a non-ownership state when physical presence has been asserted (e.g., physical presence flag 70 set as TRUE). For example, during a boot sequence and/or pre-OS 30 process, a determination is made whether ownership of TPM 14 has been established (e.g., by checking the state of owned flag 62). If ownership of TPM 14 has not yet been established and/or has otherwise been cleared, physical presence assertion is requested and physical presence flag 70 is set based on whether physical presence has been asserted (e.g., flag 70 set as TRUE indicating assertion of physical presence and FALSE if physical presence has not been asserted). In embodiments of the present invention, physical presence flag 70 is maintained in volatile memory 56 for the duration of an OS 30 session. For example, after pre-OS 30 processing and loading of OS 30 by BIOS 24, the state of physical presence flag 70 is maintained for the duration of the OS 30 session. Because physical presence flag 70 is stored in volatile memory 56, a loss of power will clear physical presence flag 70 (e.g., indicating a FALSE bit). Further, BIOS 24 is preferably configured to automatically clear physical presence flag 70 during each boot of system 12 (e.g., so that physical presence must be asserted each time system 12 is booted).

In accordance with preferred embodiments of the present invention, field upgrades to TPM 14 are implemented and/or otherwise executed while in an OS 30 environment (e.g., after OS 30 has been loaded and is running) based on whether physical presence has been asserted as indicated by flag 70 in volatile memory 56 for the purpose of approving the field upgrade when the TPM is in a non-owned state. For example, in response to receiving a command requesting execution of a field upgraded while in an OS 30 environment, physical presence is verified by accessing physical presence flag 70. If physical presence has not been asserted (e.g., as indicated by a FALSE state of flag 70), execution of the field upgrade is denied. However, if physical presence has been asserted (e.g., flag 70 set to TRUE), the field upgrade command is executed and implemented by TPM 14.

Thus, embodiments of the present invention enable a field upgrade to be authorized by an operator of system 12 in a pre-OS 30 environment for a non-owned TPM 14 to facilitate execution of the field upgrade for the TPM 14 during an OS 30 environment (e.g., while OS 30 is running). Thus, embodiments of the present invention enable an administrator or other entity to remotely and/or locally execute a field upgrade to TPM 14 for TPMs 14 that do not have an owner. Further, embodiments of the present invention prevent a global attack on TPM 14 (e.g., if the TPMs 14 vendor private key has been compromised) because execution of the field upgrade will be denied unless physical presence has been established (e.g., as indicated by physical presence flag 70).

FIGS. 2A and 2B is a flow diagram illustrating an embodiment of a trusted platform field upgrade method in accordance with the present invention. The method begins at block 200, where BIOS 24 initiates a boot procedure or sequence (e.g., a power-on self test (POST) procedure and/or a procedure to access TPM 14). At block 202, BIOS 24 clears and/or otherwise causes to be cleared physical presence flag 70 of TPM 14 (e.g., setting flag 70 to FALSE). At decisional block 204, a determination is made whether ownership is established for TPM 14 (e.g., accessing and/or otherwise determining the state of owned flag 62). If ownership is established for TPM 14, the method proceeds to block 214 to complete BIOS 24 POST procedures with the volatile physical presence flag 70 set to FALSE. If ownership of TPM 14 is not established, the method proceeds from decisional block 204 to block 208, where verification of physical presence is requested. For example, a prompt may be displayed requesting an operator and/or administrator to verify physical presence by pressing a key on the keyboard, clicking a mouse, or other such methods requiring physical presence at the system 12.

At decisional block 210, a determination is made whether physical presence has been asserted (e.g., deferred execution of a field upgrade). If physical presence has not been asserted, the method proceeds to block 214. It should be understood that if physical presence has not been asserted, system 12 may be configured to either shut down or continue booting. If physical presence has been asserted, the method proceeds from decisional block 210 to block 212, where physical presence flag 70 is set to TRUE. At block 214, BIOS 24 completes POST and/or other pre-OS 30 boot procedures. At block 216, BIOS 24 loads and/or otherwise transfers control of system 12 to OS 30.

At decisional block 218, a determination is made whether a field upgrade command for TPM 14 has been received. If a field upgrade command for TPM 14 has not been received, no further processing relating to a field upgrade of TPM 14 is necessary. If a field upgrade command for TPM 14 has been received, the method proceeds to decisional block 220, where a determination of ownership of TPM 14 is determined. If ownership of TPM 14 is established, the method proceeds to decisional block 222, where a determination is made whether the ownership credential for TPM 14 is authenticated. If the ownership credential for TPM 14 is authenticated, the method proceeds to block 230, where the field upgrade command is executed and/or otherwise implemented by TPM 14. If the ownership credential for TPM 14 is not authenticated at decisional block 222, the method proceeds to block 228 where implementation of the field upgrade is denied. If ownership of TPM 14 is not established, the method proceeds from decisional block 220 to block 224, where the state of physical presence flag 70 is determined. If physical presence has been asserted (e.g., flag 70 set to TRUE), the method proceeds to block 230, where the field upgrade command is executed and/or otherwise implemented by TPM 14. If physical presence has not been asserted (e.g., flag 70 set to FALSE), the method proceeds to block 228, where the execution and/or implementation of the received upgrade is denied.

Thus, embodiments of the present invention enable a field upgrade for TPM 14 to be implemented/executed during an OS 30 session for an non-owned TPM 14. For example, if no ownership of TPM 14 has been taken, physical presence approval for field upgrade(s) is requested and, if asserted, such physical presence assertion stored in a volatile memory portion of TPM 14. Thus, in operation, during an OS 30 session, the physical presence assertion (e.g., flag 70) acts as a gate for determining whether to execute/implement the field upgrade while in the OS 30 environment. Further, the gate for executing a field upgrade while in an OS-30 environment (e.g., flag 70) is automatically cleared in the event of a power loss and if system 12 is re-booted.

What is claimed is:

1. A trusted platform field upgrade system, comprising:
   a trusted platform module (TPM) comprising a volatile memory configured to store a first physical presence flag and a second physical presence flag, and a non-volatile memory configured to store an owned flag, wherein a state of the owned flag is not dependent on a state of either the first physical presence flag or the second physical presence flag;
   wherein the first physical presence flag can be in either a presence asserted state or a presence not asserted state and is set during a pre-OS boot sequence based on assertion of physical presence during the pre-OS boot sequence and maintains its state after the pre-OS boot sequence;
   wherein the second physical presence flag is set to a presence asserted state during the pre-OS boot sequence based on assertion of physical presence during the pre-OS sequence and is cleared after the pre-OS boot sequence; and if a field upgrade for the TPM is received after the pre-OS boot sequence, the trusted platform field upgrade system determines whether to implement the field upgrade based, at least in part, on the owned flag, wherein:
if the owned flag is in an unowned state, the field upgrade of the TPM is implemented only if the first physical presence flag is in the presence asserted state; and
if the owned flag is in an owned state, the field upgrade of the TPM is implemented only if an ownership credential for the TPM is authenticated.

2. The system of claim 1, further comprising a basic input/output system (BIOS) configured to clear the second physical presence flag.

3. The system of claim 1, further comprising a BIOS configured to clear the second physical presence flag during a pre-OS boot sequence.

4. The system of claim 1, where the first physical presence flag is assertable in a pre-OS environment.

5. The system of claim 1, where the TPM is configured to maintain assertion of the first physical presence flag throughout an OS session.

6. A trusted platform field upgrade method, comprising:
determining a state for an owned flag in a non-volatile memory in a trusted platform module (TPM);
determining a state for a first presence asserted flag in a volatile memory in the TPM, wherein the first presence asserted flag is set during a pre-OS boot sequence based on assertion of physical presence during the pre-OS boot sequence, and maintains its state after the pre-OS boot sequence;
determining a state for a second presence asserted flag in a volatile memory in the TPM wherein the second presence asserted flag is set to a presence asserted state during the pre-OS boot sequence based on assertion of physical presence during the pre-OS sequence and is cleared after the pre-OS boot sequence;
wherein a state of the owned flag is not dependent on a state of either the first physical presence flag or the second physical presence flag; and
if a field upgrade for the TPM is received after the pre-OS boot sequence, determining whether to allow the field upgrade based, at least in part, on the owned flag, wherein:
if the owned flag is in an unowned state, the field upgrade for the TPM is allowed only if the first presence asserted flag is in the presence asserted state; and
if the owned flag is in an owned state, the field upgrade for the TPM is allowed only if an ownership credential for the TPM is authenticated.

7. The trusted platform field upgrade method of claim 6, comprising:
establishing the state for the presence asserted flag.

8. The trusted platform field upgrade method of claim 7, comprising:
maintaining the state for the presence asserted flag throughout an operating system (OS) session.

9. An apparatus, comprising:
a volatile memory configured to store a first Trusted Computing Platform Alliance (TCPA) physical presence asserted flag and a second TCPA physical presence asserted flag, wherein the first TCPA physical presence asserted flag and the second TCPA physical presence asserted flag can be in either a presence asserted state or a presence not asserted state;
wherein the first TCPA physical presence asserted flag is set during a pre-OS boot sequence based on assertion of physical presence during the pre-OS boot sequence and maintains its state after the pre-OS boot sequence; and
wherein the second TCPA physical presence asserted flag is set to a presence asserted state during the pre-OS boot sequence based on assertion of physical presence during the pre-OS sequence and is cleared after the pre-OS boot sequence;
a non-volatile memory configured to store a TCPA owned flag that can be in either an owned state or an unowned state, and where the state of the TCPA owned flag is not dependent on the state of the first or the second TCPA physical presence asserted flag; and
a decision logic configured to control whether to allow a field upgrade to a trusted platform module (TPM) associated with the apparatus and received after the pre-OS boot sequence, wherein:
if the TCPA owned flag is in an unowned state, the field upgrade of the TPM is allowed only if the first TCPA physical presence asserted flag is in the presence asserted state; and
if the TCPA owned flag is in an owned state, the field upgrade of the TPM is allowed only if an ownership credential for the TPM is authenticated.

10. The apparatus of claim 9, where the decision logic blocks a field upgrade to the TPM upon determining that the owned flag is in an unowned state and that the physical presence asserted flag is in a physical presence not asserted state.

* * * * *